Patented Dec. 3, 1929

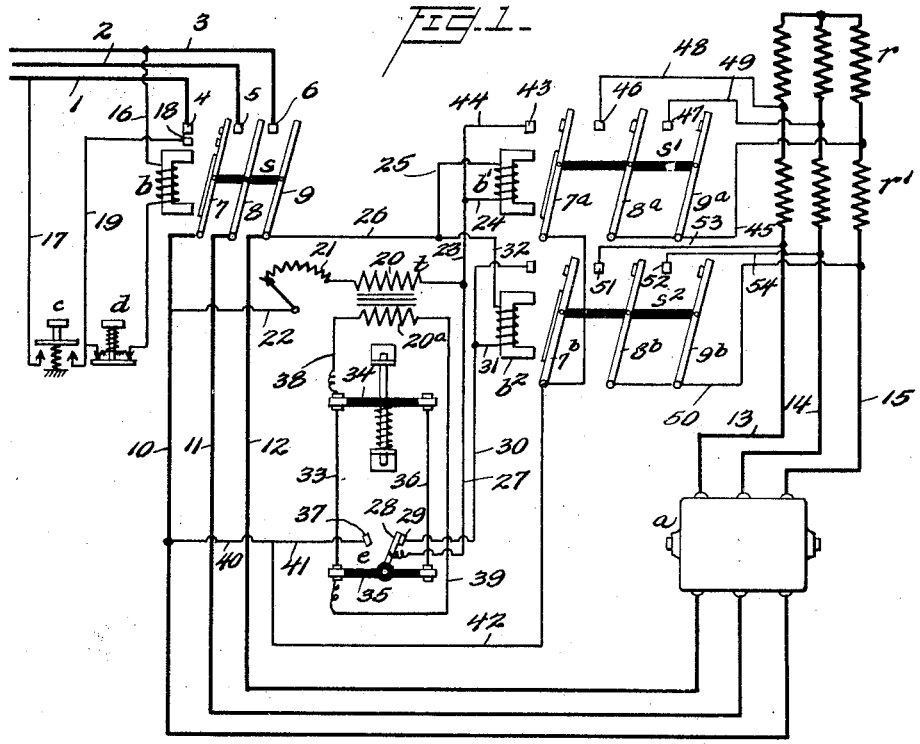

1,738,488

UNITED STATES PATENT OFFICE

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND

THERMAL CONTROL OF ALTERNATING-CURRENT ELECTROMAGNETIC DEVICES

Application filed March 29, 1928. Serial No. 265,596.

This invention relates to thermally operated means for controlling electromagnetic devices which are actuated by alternating electric current. The purpose of the invention is to provide means for causing delay in the actuation of such devices after the closure of a main switch through which they receive current from a current source. The invention is particularly adapted for use in connection with starters for alternating current motors, to cause delayed action of one or more contactors used for cutting out starting resistance, but is useful in connection with various other devices operated by alternating current, such as signaling devices, where it is required that such devices shall operate at suitably timed intervals after the closure of a main switch.

In carrying out the invention, I provide a small transformer having a primary winding which is connected to an alternating current supply circuit by the closure of a main switch and having a secondary winding which is closed through the heating element of a thermally operated relay switch. This relay, when said element is heated, temporarily closes a circuit through the coil of an electromagnetic switch and the latter switch then closes and de-energizes the primary circuit of the transformer and also completes a holding circuit through its coil in shunt to the thermostat switch. When the primary winding of the transformer is de-energized, current ceases to flow in the secondary circuit, the heating element cools, and the thermostat switch opens the temporary circuit through the coil of said electromagnetic switch. A second electromagnetic device may be caused to operate in a predetermined time after the closure of said electromagnetic switch, through a circuit made up by the closure of the latter switch and by the return of the thermostatic switch arm to its normal position.

In the accompanying drawing,

Fig. 1 is a diagram illustrating the application of my invention to a two-step starter for multi-phase electric motors, the arrangement being such that the primary of the transformer is short circuited by the switch which cuts out the first step of resistance; and, Fig. 2 is a diagram showing an arrangement of the invention for operating signals, or for other purposes, in which the circuit of the primary winding of the transformer is interrupted upon the closure of an auxiliary switch, the apparatus being shown connected to a single phase circuit.

Referring to Fig. 1 of the drawing, 1, 2 and 3 indicate supply wires leading from a multi-phase current source to the stationary contacts 4, 5 and 6, respectively, of a main switch $s$. This switch comprises arms 7, 8 and 9, adapted to engage the contacts and electrically connect the same with wires 10, 11 and 12, leading to the stator of a multi-phase motor $a$. The rotor of the motor is connected by leads 13, 14 and 15 to a starting resistance comprising sections $r$, $r'$. An auxiliary switch $s'$ is provided for cutting out the section $r$ of the starting resistance, and an auxiliary switch $s^2$ is provided for cutting out the resistance section $r'$. The switches $s$, $s'$ and $s^2$ are normally open and are adapted to be closed by magnets $b$, $b'$ and $b^2$, respectively.

The circuit of the main switch magnet $b$ is controlled by a start push button $c$ and a stop push button $d$, the former being normally open and the latter normally closed. As shown, the circuit of the magnet extends by conductor 16 from supply wire 3 to the coil of the magnet, thence through the normally closed push button switch $d$ to the normally open push button switch $c$, and thence by conductor 17 to the supply wire 1. It will be evident that closure of the start push button $c$ will complete the cuircuit through the magnet and the latter will move the main switch to closed position. When the main switch closes, a holding circuit for the magnet $b$ is established by the switch arm 7 which connects the contact 4 with a contact 18, which latter is connected by conductor 19 to the circuit of the magnet between the push button switches $c$ and $d$. To open the main switch $s$, the push button $d$ is depressed and this interrupts the holding circuit, and the main switch then falls to open position.

When the main switch closes, the coils of the magnets $b'$ and $b^2$ are connected to the supply wires 1 and 3, through the primary winding 20 of a small transformer $t$, and there may also be included in this circuit a dead resistance 21. The current which flows through the primary of the transformer to these magnet coils is so restricted in volume that the magnets will not be fully energized and therefore will not close the switches $s'$ or $s^2$. The circuit through the primary of the transformer extends from supply wire 1 to motor lead 10, thence through conductor 22 to the resistance 21, thence through primary winding 20 of the transformer $t$ to conductors 23 and 27, where it divides, part of the current going through conductors 23 and 24, the coil of magnet $b'$, thence by conductors 25 and 26 to the arm 9 of the main switch and thence to supply wire 3. From the transformer, part of the current flows through conductor 27 to arm 28 of a thermostat switch $e$, thence through a contact 29, which is normally engaged by said arm, thence through conductors 30 and 31 to coil of magnet $b'$, thence through conductor 32 to conductor 26 and main switch arm 9 to supply wire 3.

The secondary winding $20^a$ of the transformer is permanently closed through the heating element 33 of a thermostat which controls the switch $e$. The heating element 33, in this instance, is a thermally expansible wire. As shown, this expansible wire is connected to one end of a spring-pressed cross arm 34 and to one end of a centrally pivoted lever 35. A similar expansible wire 36 is connected between the opposite ends of the cross bar and lever. The two expansible wires expand and contract equally with changes in atmospheric temperature, and therefore the lever does not rock by reason of changes in the weather. But when the wire 33 is heated by the passage of current through it, said wire expands and this causes the switch arm 28, which is attached to the lever, to rock out of engagement with the contact 29 and into engagement with a contact 37. As shown in the drawing, one terminal of the secondary winding of the transformer is connected by conductor 38 to one end of the heating element 33, and the other end of said element is connected by conductor 39 to the opposite terminal of the secondary winding of the transformer. The secondary circuit is thus always closed through the heating elements, and when current is flowing through the primary of the transformer, current will also flow through the secondary and the switch arm 28 will move slowly out of engagement with contact 29 and into engagement with the contact 37. When this occurs, the primary of the transformer will be short circuited and the magnet $b'$ will receive full current and will close the auxiliary switch $s'$. This shunt around the primary coil of the transformer, which constitutes the energizing circuit for the magnet $b'$, extends from supply wire 1, through lead 10, to conductors 40 and 41, thence through contact 37 and switch arm 28 to conductor 27, thence through conductors 23 and 24 to coil of magnet $b'$, thence through conductors 25 and 26 and through main switch arm 9 to supply wire 3. The magnet $b'$ will then close the switch $s'$ and its switch arm $7^a$ will close a holding circuit for the magnet $b'$ and also close a shunt circuit around the thermostat switch $e$, and around the primary winding of the transformer. Thus, the arm $7^a$ is connected to the side 1 of the supply circuit through main switch arm 7, lead 10, and conductors 40 and 42, and when the switch arm $7^a$ is closed, it engages contact 43, which is connected by conductor 44 to one terminal of magnet $b'$ through conductor 24, and the circuit then proceeds through conductors 25 and 26 and switch arm 9 to the side 3 of the supply circuit. The magnet $b'$ will therefore hold the switch $s'$ closed and maintain a shunt around the switch $e$ and around the primary of the transformer after the latter has been temporarily shunted by the engagement of the arm 28 with the stationary contact 37 of the thermostat switch. When the primary of the transformer is short circuited, the current in the secondary ceases to flow, the heating element 33 contracts and gradually moves the contact arm 28 away from the contact 37 and into engagement with the contact 29, thereby, in conjunction with the switch arm $7^a$ of the switch $s'$, now closed, making up an energizing circuit through the coil of magnet $b^2$, from side 1 of the supply circuit through conductors 10, 40 and 42, switch arm $7^a$, contact 43 and conductors 44, 23 and 27 to the arm 28 of thermostat switch $e$, thence through contact 29 of said switch and conductors 30 and 31 to the coil of magnet $b^2$, and thence through conductors 32 and 26 and arm 9 of main switch $s$ to the side 3 of the supply circuit. The magnet $b^2$ will thus be fully energized and will cause the closure of the switch $s^2$ in a predetermined time after the closure of the switch $s'$. Thus, the auxiliary switch $s'$ closes when the thermostat switch arm 28 engages the contact 37, and the auxiliary switch $s^2$ closes when the thermostat arm 28 returns into engagement with the contact 29.

The arms $8^a$ and $9^a$ of the auxiliary switch $s'$ are connected by conductor 45 to the resistance lead 15, and these arms are adapted to engage contacts 46 and 47, which are connected by conductors 48 and 49 to the resistance leads 13 and 14, respectively, so that when the switch $s'$ closes, the resistance sections $r$ are short circuited by the switch. Similarly, the arms $8^b$ and $9^b$ of the auxiliary switch $s^2$ are connected by conductor 50 to the lead 15, and these arms engage contacts 51 and 52, which are connected by conductors 53 and 54 to the leads 13 and 14, respectively. It will be evident that when the switch $s^2$ closes, it short circuits the resistance sections $r'$.

To stop the motor, the push button switch $d$ is pressed to open position, thus breaking the circuit through the coil of magnet $b$ of the main switch, and the latter opens, thereby opening the circuits through the magnets of the auxiliary switches and the latter then open, breaking the short circuits around the starting resistances and also the shunt around the primary winding of the transformer and around the thermostat switch and leaving the primary of the transformer in series with the coils of the magnets of the auxiliary switches, ready for the next starting operation.

In Fig. 2 of the drawing, L and L' indicate supply wires leading from an alternating current source, and $s^3$ indicates a two pole main switch for connecting the apparatus to be controlled to said wires. The main switch may be opened and closed by any suitable means. The transformer $t$ and thermally operated switch $e$ are the same as in Fig. 1, and the parts are similarly numbered, but the primary winding 20 of the transformer, instead of being connected so that it will be short circuited when the switch $s^4$ closes, is connected so that the latter switch, in closing, will break the circuit through the primary winding to de-energize the same. Rods 65 are shown connected to the arms $7^c$ and $7^d$ of the switches $s^4$ and $s^5$, so that these arms will perform work, such as operating signals.

The arm 55 of the main switch is connected by conductors 56 and $56^a$ to the arms $7^c$ and $7^d$ of the switches $s^4$ and $s^5$, respectively. The conductor 58 leads from the main switch arm 57 through the coil of magnet $b^4$ and thence to arm 28 of the thermostat switch $e$, and from the contact 29 of the latter switch, a conductor 59 leads to the coil of magnet $b^5$, and thence to the main switch arm 57, these connections being the same as in the previously described figure.

The arm $7^c$ of the switch $s^4$ carries an insulated contact 60, and the circuit of the primary winding 20 of the transformer is completed through this contact when the switch is open. Thus, the circuit of the primary winding extends from main switch arm 55, through conductors 56 and 22, to resistance 21, thence through the primary winding and by conductor 61 to the contact 60, thence by conductor 62 to the arm 57 of the main switch. A secondary winding $20^a$ is closed through the heating element 33 of the thermostat, the same as in Fig. 1, and the contact 37 is connected by conductors 63 and 56 to the main switch arm 55.

In operation, when the main switch is closed, the primary of the transformer is connected through said switch to the supply wires, and the current induced in the secondary of the transformer causes the thermostat to slowly move the arm 28 away from the contact 29 and into engagement with the contact 37. When said arm engages the latter contact, a temporary circuit through the coil of magnet $b^4$ of the switch $s^4$ is made, from the main switch arm 55, through conductors 56 and 63 to the contact 37, thence through arm 28 and conductor 58 to coil of magnet $b^4$, and thence to main switch arm 57. The magnet $b^4$ then closes the switch $s^4$ and the latter, in closing, interrupts the circuit through the primary of the transformer. When the switch $s^4$ closes, its arm $7^c$ engages a contact 64 and establishes a holding circuit through the coil of the magnet $b^4$ and the latter keeps the switch closed. As the heating element of the thermostat cools, following the interruption of the primary of the transformer, the switch arm 28 slowly return to its normal position against the contact 29, and when it engages said contact the circuit is completed through the coil of magnet $b^5$, and the latter closes the switch $s^5$. This circuit extends from the main switch arm 55, through conductor 56 to switch arm $7^c$ and contact 64, thence through conductor 58 and switch $e$ to conductor 59 and coil of magnet $b^5$ to the main switch arm 57. When the switch $s^5$ closes, the arm $7^d$ engages contact 66 and establishes a holding circuit for said magnet. When the main switch is opened, the circuits through the magnets are de-energized and the switch arms $7^c$ and $7^d$ return to their normal positions, the former completing the primary circuit of the transformer to the main switch.

It will be evident that the members $7^c$ and $7^d$, or either of them, may be employed to perform mechanical work, or to open and close circuits for any purpose, such as signaling. The electromagnetic device $s^4$ may be used and the device $s^5$ may be omitted when only one device is needed to perform the work and where the time interval between the closure of the main switch and the operation of said device is relatively short; but where a longer time interval is required the work may be performed by the device $s^5$, which does not operate until the arm of the thermostat has moved from its normal position and returned to said position.

What I claim is:

1. The combination with an alternating current supply circuit, a main switch and an electromagnetically operated device, of a circuit for the magnet of said device connected to the main switch, a normally open thermostat switch in said magnet circuit, a transformer having a primary winding adapted to be connected to the supply circuit by the main switch and a thermostat having a heating element in the secondary circuit of the transformer, said thermostat adapted to close said thermostat switch when said element is heated.

2. The combination with an alternating current supply circuit, a main switch and an electromagnetically operated device, of a circuit for the magnet of said device connected to the main switch, a normally open thermostat switch in said magnet circuit, a transformer having a primary winding adapted to be connected to the supply circuit by the main switch and a thermostat having a heating element in the secondary circuit of the transformer, said thermostat adapted to close said thermostat switch when said element is heated, and said device, when operated, adapted to de-energize the primary winding of the transformer.

3. The combination with an alternating current supply circuit, a main switch and two electromagnetic devices, of energizing circuits for the magnets of said devices connected to the main switch, a thermostat switch in said latter circuits and means for operating said devices in succession comprising a transformer having a primary winding adapted to be connected to the supply circuit by the main switch, a thermostat having a heating element in the secondary circuit of the transformer, said thermostat adapted to move the thermostat switch to complete the energizing circuit for one of said devices when said element is heated, said latter device adapted, when operated, to deenergize the primary winding of the transformer and, in conjunction with the thermostat switch, to complete the energizing circuit of the other of said devices when said element has cooled.

4. The combination with an alternating current motor, its circuits and a starting resistance, of a starter for the motor comprising a main switch for connecting the motor to a supply circuit, an auxiliary switch for cutting resistance out of the motor circuits, a magnet for closing the latter switch, a circuit for the magnet connected to the main switch, a normally open thermostat switch in the magnet circuit, and means for closing the latter switch in a predetermined time after the closure of the main switch comprising a transformer having its primary winding adapted to be connected to the supply circuit by the main switch and having its secondary circuit closed through the heating element of the thermostat, said auxiliary switch, in closing, adapted to de-energize the primary circuit of the transformer.

5. The combination with an alternating current motor, its circuits and a starting resistance, of a starter for the motor comprising a main switch for connecting the motor to a supply circuit, a series of auxiliary switches for cutting resistance out of the motor circuits, magnets for closing the latter switches, a circuit for the magnet of the first switch in the series adapted to be connected to the supply circuit by said main switch, a circuit for the magnet of the second auxiliary switch adapted to be connected to the supply circuit by the first auxiliary switch in the series, a thermostat switch controlling said magnet circuits, and a transformer having its primary winding adapted to be connected to the supply circuit by the main switch and having its secondary circuit closed through the heating element of the thermostat, said thermostat adapted, when said element is heated, to complete the circuit of the first magnet in the series and cause the closure of the first auxiliary switch, said first switch, in closing, adapted to de-energize the primary circuit of the transformer, and said thermostat adapted, when its heating element has cooled, to complete the circuit of the second magnet in the series.

6. The combination with an alternating current motor, its circuits and a starting resistance, of a starter for the motor comprising a main switch for opening and closing the motor circuits, an auxiliary switch, a magnet for actuating the latter switch, a circuit for the magnet adapted to be closed by the main switch, a transformer having its primary winding in said magnet circuit and a thermostat having a heating element in the secondary circuit of the transformer, said thermostat adapted to short circuit said primary winding when said element is heated by current in the secondary circuit.

7. The combination with an alternating current motor, its circuits and a starting resistance, of a starter for the motor comprising a main switch for opening and closing the motor circuits, an auxiliary switch, a magnet for actuating the latter switch, a circuit for the magnet adapted to be closed by the main switch, a transformer having its primary winding in said magnet circuit and a thermostat having a heating element in the secondary circuit of the transformer, said thermostat adapted to short circuit said primary winding when said element is heated by current in the secondary circuit, and said auxiliary switch, when closed, adapted to maintain a short circuit around said primary winding.

8. The combination with an alternating current motor, its circuits and a starting resistance, of a starter for the motor comprising a main switch for closing the motor circuits, a series of auxiliary switches for cutting out starting resistance, a series of magnets for closing said switches, a transformer, a circuit normally connecting the primary of the transformer in series with said magnets and adapted to be closed by said main switch, and a thermostat having a heating element in the secondary circuit of the transformer, said thermostat adapted to open the circuit through the second magnet in the series and then short circuit said primary winding when said element is heated by current in the secondary circuit of the transformer, whereby the first magnet in the series becomes energized and closes its associated switch, said latter switch adapted to maintain a shunt around the primary of the transformer and said thermostat adapted, upon cooling of its heating element, to complete the circuit of the second magnet in the series through said shunt to said primary winding established by the first auxiliary switch.

In testimony whereof I hereunto affix my signature.

GEORGE H. WHITTINGHAM.